(12) United States Patent
Kato et al.

(10) Patent No.: US 7,103,741 B2
(45) Date of Patent: Sep. 5, 2006

(54) TAPE DRIVE APPARATUS AND RECORDING AND/OR REPRODUCING METHOD

(75) Inventors: Tatsuya Kato, Kanagawa (JP); Masaki Yoshida, Tokyo (JP); Katsumi Ikeda, Kanagawa (JP); Yoshihisa Takayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 266 days.

(21) Appl. No.: 10/750,813

(22) Filed: Jan. 5, 2004

(65) Prior Publication Data

US 2004/0190179 A1    Sep. 30, 2004

(30) Foreign Application Priority Data

Jan. 8, 2003    (JP)    ............................ P2003-002212

(51) Int. Cl.
*G06F 12/14*    (2006.01)

(52) U.S. Cl. ........................................ 711/163; 360/60

(58) Field of Classification Search ................ 713/193; 360/60, 69, 132; 369/30; 235/382, 385; 711/163

See application file for complete search history.

(56) References Cited

U.S. PATENT DOCUMENTS

| | | | | |
|---|---|---|---|---|
| 4,338,644 A | * | 7/1982 | Staar | ........................... 360/132 |
| 4,960,982 A | * | 10/1990 | Takahira | ...................... 235/382 |
| 5,303,214 A | * | 4/1994 | Kulakowski et al. | ....... 369/30.3 |
| 5,455,409 A | * | 10/1995 | Smith et al. | ................. 235/385 |
| 5,493,455 A | * | 2/1996 | Miyoshi et al. | ............... 360/60 |
| 2002/0035695 A1 | * | 3/2002 | Riches et al. | ............... 713/193 |
| 2002/0191322 A1 | * | 12/2002 | Jerman | ......................... 360/69 |

FOREIGN PATENT DOCUMENTS

| | | |
|---|---|---|
| JP | 2550931 | 8/1996 |
| JP | 9-237474 | 9/1997 |

* cited by examiner

*Primary Examiner*—Matthew Kim
*Assistant Examiner*—Paul Schlie
(74) *Attorney, Agent, or Firm*—Rader, Fishman & Grauer PLLC; Ronald P. Kananen

(57) ABSTRACT

A tape cassette of this invention is equipped with a memory capable of accommodating at least management information including identification information unique to each tape cassette. A magnetic tape housed in the tape cassette is written with identification information that is supposed to be the same in content as the memory-stored identification information. When the tape cassette is loaded into a tape drive system, the system acquires both the memory-stored identification information and the tape-stored identification information to determine a match therebetween. A mismatch between the two sets of identification information, if detected, is interpreted to mean that the tape cassette has been tampered with, and read and write operations on the cassette are restricted accordingly. This enhances security against fraudulent uses of the tape drive system.

2 Claims, 15 Drawing Sheets

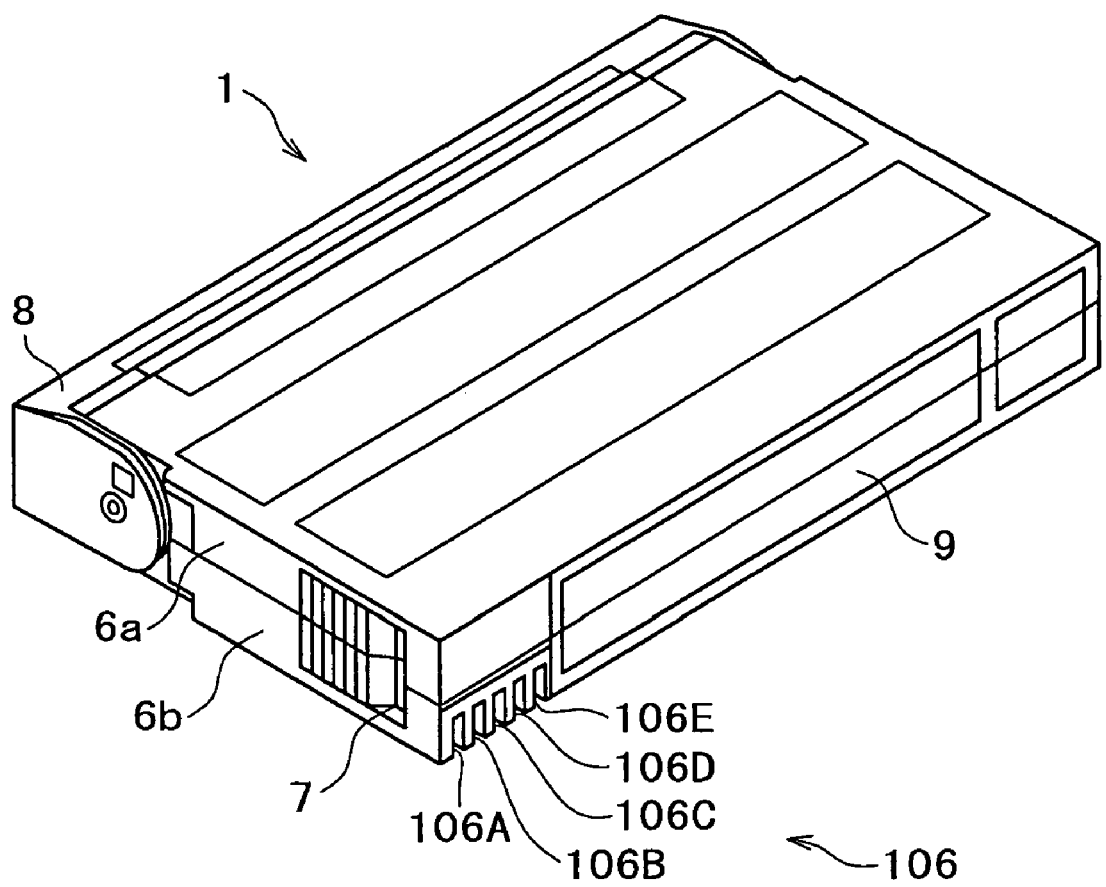
F I G. 4

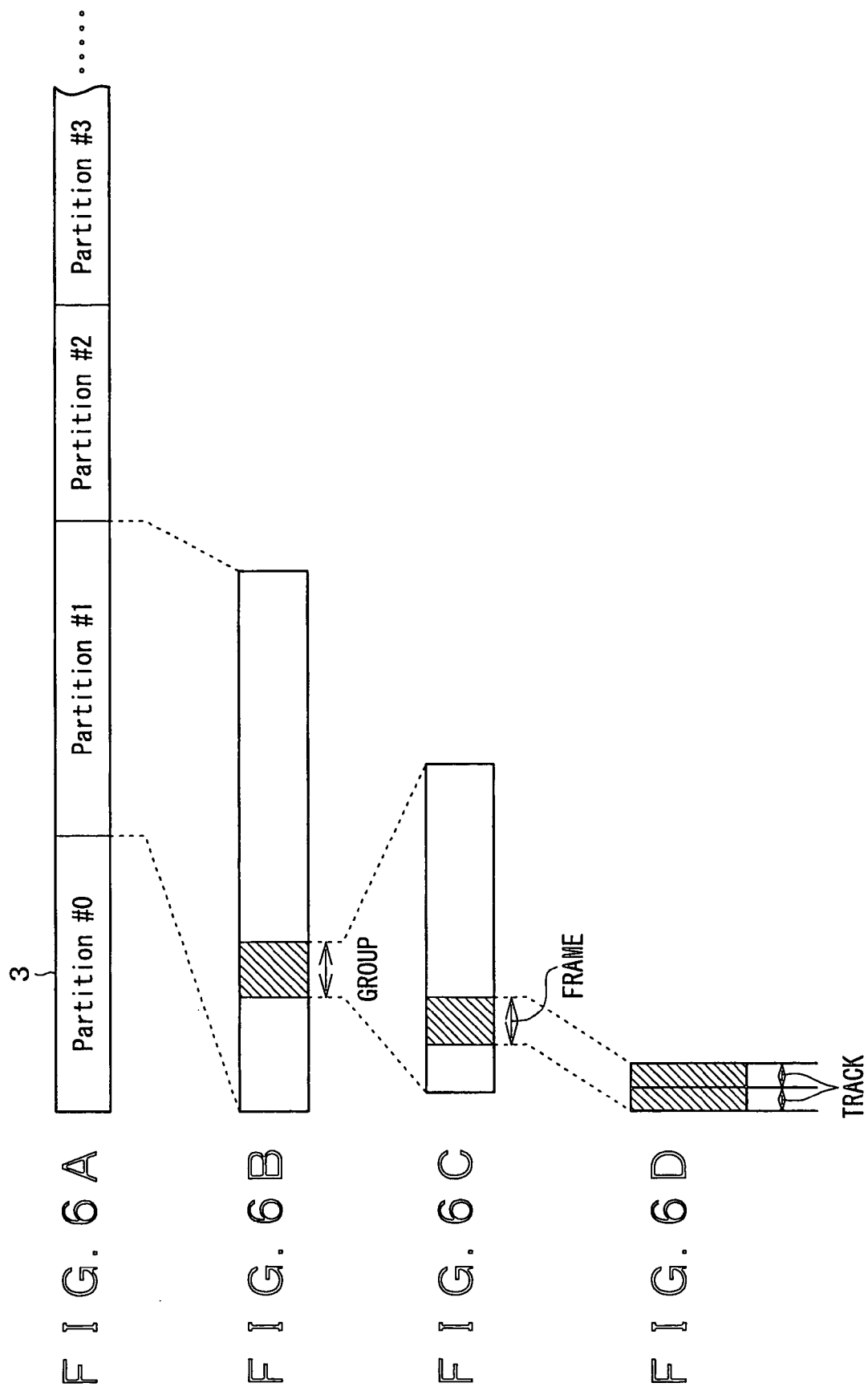

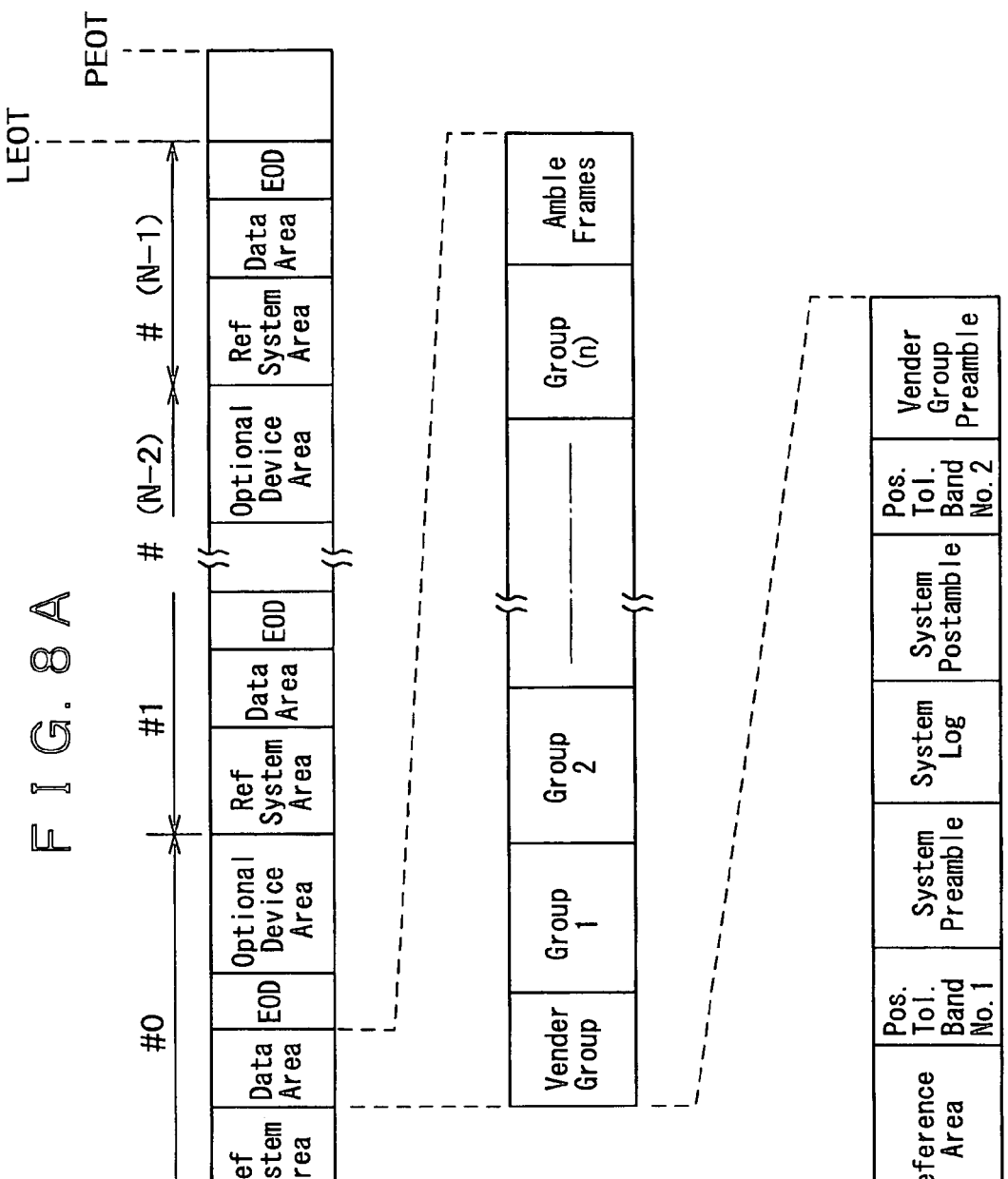

FIG. 9

| MIC HEADER | | |
|---|---|---|
| | MANUFACTURE PART | (96bytes) |
| | SIGNATURE | (64bytes) |
| | CARTRIDGE SERIAL NUMBER | (32bytes) |
| | CARTRIDGE SERIAL NUMBER CRC | (16bytes) |
| | SCRATCH PAD MEMORY | (16bytes) |
| | MECHANISM ERROR LOG | (16bytes) |
| | MECHANISM COUNTER | (16bytes) |
| | LAST 11 DRIVE LIST | (48bytes) |
| | DRIVE INITIALIZE PART | (16bytes) |
| | VOLUME INFORMATION | (112bytes) |
| | ACCUMULATIVE SYSTEM LOG | (64bytes) |
| | VOLUME TAG | (528bytes) |

| MEMORY FREE POOL | |
|---|---|
| | PARTITION INFORMATION CELL #0 |
| | PARTITION INFORMATION CELL #1 |
| | ⋮ |
| | USER PARTITION NOTE CELL #1 |
| | USER PARTITION NOTE CELL #0 |
| | USER VOLUME NOTE CELL |
| | SUPER-HIGH SPEED SEARCH MAP CELL |

F I G. 1 0

| | | |
|---|---|---|
| Manufacture Part | manufacture part checksum | 1 byte |
| | mic type | 1 byte |
| | mic manufacture date | 4 bytes |
| | mic manufacture line name | 8 bytes |
| | mic manufacture plant name | 8 bytes |
| | mic manufacture name | 8 bytes |
| | mic name | 8 bytes |
| | cassette manufactured date | 4 bytes |
| | cassette manufacturer line name | 8 bytes |
| | cassette manufacturer plant name | 8 bytes |
| | cassette manufacturer name | 8 bytes |
| | cassette name | 8 bytes |
| | oem customer name | 8 bytes |
| | physical tape characteristic ID | 2 bytes |
| | maximum clock frequency | 2 bytes |
| | block size | 1 byte |
| | mic capacity | 1 byte |
| | write protect top address | 2 bytes |
| | write protect count | 2 bytes |
| | reserved | 1 byte |
| | application ID | 1 byte |
| | offset | 2 bytes |

FIG. 12

| | | | |
|---|---|---|---|
| 1 to 48 | Partition N Information | 48 Bytes | 66,816 Bytes |
| 49 to 96 | Partition N Information | 48 Bytes | |
| ...... | ...... | | 24,576 Bytes = 48 Bytes * 512 |
| 24,528 to 24,576 | Partition N Information | 48 Bytes | |
| 24,577 and 24,578 | System Log Vender Data Type Number | 2 Bytes | |
| 24,579 to 66,816 | System Log Vender Data | | 42,238 Bytes |

Partition Information ⟵⎯⎯⟶

FIG. 13

| Value | Definition |
|---|---|
| 0 | Not in use. |
| 1 | Super High Speed Search MAP |
| 2 | MIC Manufacture Header Information |
| 3 | MIC Cartridge Serial Number |
| The other | Reserved |

FIG. 14

| Offset | Definition | Size | Comments |
|---|---|---|---|
| 0~31 | MIC Cartridge Serial Number | 32 Bytes | ex."10123458900000034500000067894325" |
| 32 | Manufacturer ID | 1 Byte | ex.'S' |
| 33 | Secondary ID | 1 Byte | ex.'X' |
| 34 | Checksum | 1 Byte | Scope:offset 0~33:Exclusive OR |
| 35~54,453 or 42,237 | Reserved | 54,419 or 42,203 Bytes | All zero |

TAPE DRIVE APPARATUS AND RECORDING AND/OR REPRODUCING METHOD

BACKGROUND OF THE INVENTION

The present invention relates to a recording medium in the form of a tape cassette containing a magnetic tape, to a tape drive apparatus capable of recording and/or reproducing information to and/or from the tape cassette, and to a recording and/or reproducing method for use with the tape drive apparatus.

Tape streamer drives are a well-known drive apparatus for recording and reproducing digital data to and from a magnetic tape serving as a recording medium held in a tape cassette. Depending on the tape length of the tape cassette they use, some tape streamer drives can record large quantities of data amounting to tens to hundreds of gigabytes. Their mass storage capability allows the tape streamer drives to be utilized extensively in diverse applications including the backup of data recorded illustratively on hard discs in the computer body and the storage of picture data and other massive data.

In a data storage system made up of such a tape streamer drive and a tape cassette containing a magnetic tape, management information or the like is needed for the drive to manage appropriately its recording and/or reproduction of data to and/or from the magnetic tape. The management information includes information about diverse locations on the magnetic tape as well as a use history of the tape.

A management information area is located at the beginning of the magnetic tape or at the beginning of each of the partitions formed along the tape. Before writing or reproducing data to or from the magnetic tape, the tape streamer drive gains access to the management information area to read necessary management information therefrom. Based on the management information thus retrieved, the tape streamer drive performs various processes allowing subsequent recording or reproducing operations to proceed appropriately.

At the end of the data recording or reproduction of data, the tape streamer drive again accesses the management information area to update the relevant information therein in a manner reflecting any changes resulting from the preceding recording or reproducing operation. The updates are carried out to prepare for the next recording or reproducing operation. Thereafter, the tape cassette is unloaded and ejected from the tape streamer drive.

Where recording and/or reproduction is performed on the basis of such management information, the tape streamer drive is required twice to access the management information area at the beginning of the magnetic tape or of one of its partitions: first, before the operation is started, and later, when the operation has ended, so that the relevant data should be written to and read from the area each time. In other words, the tape cassette cannot be loaded or unloaded halfway through the recording or reproducing operation along the magnetic tape.

Upon access to the management information area, the tape streamer drive is required physically to feed the magnetic tape. That means it takes some time to access the beginning of the magnetic tape or of one of its partitions. In particular, if the recording or reproducing operation on the magnetic tape ends at a considerable physical distance from the management information area, it takes a correspondingly long time to feed the tape before the target area can be reached.

As described, data storage systems that utilize tape cassettes as their recording media require a relatively long access time before a single write or read operation is completed, i.e., from the time the magnetic tape was loaded until it is unloaded. It is obviously preferable to minimize the time required for such a series of access-related operations.

For that purpose, techniques have been proposed whereby a nonvolatile memory is installed within a tape cassette enclosure so that the memory may accommodate management information (refer illustratively to Japanese Patent Laid-open No. Hei 9-237474). The tape streamer drive for use with such a memory-equipped tape cassette incorporates an interface for writing and reading management information to and from the nonvolatile memory, i.e., information about the recording and reproduction of data to and from the magnetic tape.

The above arrangement eliminates the need illustratively to rewind the magnetic tape at the time of loading or unloading of the cassette. That is, the tape cassette may be loaded or unloaded halfway through the ongoing operation along the tape.

As described, the nonvolatile memory is attached to the tape cassette to shorten access time and gain other benefits. As long as the tape cassette is normally used, the content of data placed in the nonvolatile memory is generally kept consistent with the initial purpose of the tape cassette and with its past history of write and read operations made thereto and therefrom.

Typically, the above-described nonvolatile memory for the tape cassette is secured mechanically inside the cassette enclosure. That means it is impossible to exclude the possibility that the initially installed nonvolatile memory might be removed from within the enclosure and replaced by an illicit nonvolatile memory.

Described below is a concrete example of how the tape cassette can be tampered with. In addition to the normal-type tape cassette for normal data storage, there have been developed and marketed tape cassettes intended for special uses. A tape cassette for one of such special uses is illustratively designed to have a magnetic tape to which data can be recorded only once. Once recorded on the tape, the data can only be read and not overwritten. This tape cassette feature is called WORM (Write Once Read Many). The WORM feature is also provided to disc type recording media such as CD-Rs and DVD-Rs.

On a WORM tape cassette, data can only be read from the data-recorded areas and no data can be written thereto. History information about the read and other operations on the tape cannot be updated in a manner causing any management information area associated with the recorded areas to reflect the past changes. Such history information can only be written to the nonvolatile memory in the tape cassette. Therefore, the management information that needs to be consistent with the WORM tape cassette is always stored into its nonvolatile memory. Where the WORM tape cassette is subject to the recording and/or reproduction of data, it is mandatory to use the management information held in the nonvolatile memory of the cassette, not any management information recorded on the magnetic tape.

Suppose now that a malicious user has illicitly replaced the original nonvolatile memory of the WORM tape cassette and that the memory contains not any information designating the WORM feature but information designating only a normal type tape cassette. In that case, the tape cassette originally designed to provide the WORM feature will be recognized as a normal type tape cassette if the designating information in the nonvolatile memory is referenced as the basis for the recognition. This will enable attempts to write data even to the recorded areas on the tape. That is, data can be falsified or otherwise corrupted on the tape in the cartridge.

Illustratively, WORM tape cassettes are actually utilized most often for the recording of important data that call for secure measures to maintain their high storage value, given the premise that recorded data can only be read, neither overwritten nor erased. Hence the high levels of security demanded by and offered to the data accommodated by the WORM tape cassette, so that the data will not be destroyed or falsified on the magnetic tape inside.

The fraudulent case above involving the WORM tape cassette is but one example of tape cassette tampering. Regardless of their intended purposes, nonvolatile memory-equipped tape cassettes could have their data destroyed or corrupted on the magnetic tape if their memories were illicitly replaced.

In actually marketing nonvolatile memory-equipped tape cassettes, tape cassette venders are required to provide a scheme for preventing cases of tampering such as illegal replacement of the nonvolatile-memory.

SUMMARY OF THE INVENTION

In solving the foregoing and other problems of the related art and according to one aspect of the invention, there is provided a tape drive apparatus including a tape-oriented recording and/or reproducing element for recording and/or reproducing information to and/or from a magnetic tape housed in a tape cassette furnished as a recording medium, the tape cassette being loaded in the apparatus; a memory accessing element for accessing a memory which is incorporated in the tape cassette furnished as the recording medium and which at least holds management information for write and/or read operations to and/or from the magnetic tape, the memory accessing element writing and/or reading information to and/or from the memory following the accessing; a memory-oriented information acquiring element for acquiring identification information from the memory through an access operation thereto performed by the memory accessing element, the identification information being stored in the memory as part of the management information and assigned uniquely to the tape cassette so as to distinguish the tape cassette from other tape cassettes; and a tape-oriented information acquiring element for acquiring identification information from the magnetic tape through an access operation thereto performed by the tape-oriented recording and/or reproducing element, the identification information being recorded in a predetermined area on the magnetic tape and supposed to be the same in content as the memory-stored identification information. The apparatus further includes a determining element for determining whether there is a match between the memory-stored identification information acquired by the memory-oriented information acquiring element on the one hand and the tape-stored identification information acquired by the tape-oriented information acquiring element on the other hand, and an operation controlling element for controlling the recording and/or reproduction of information to and/or from the recording medium by controlling the operation of the tape-oriented recording and/or reproducing element at least in accordance with a result of the determination made by the determining element.

According to another aspect of the invention, there is provided a recording and/or reproducing method for use with a tape drive apparatus. The method includes the steps of: recording and/or reproducing information to and/or from a magnetic tape housed in a tape cassette furnished as a recording medium, the tape cassette being loaded in the apparatus; accessing a memory which is incorporated in the tape cassette furnished as the recording medium and which at least holds management information for write and/or read operations to and/or from the magnetic tape, the memory accessing step writing and/or reading information to and/or from the memory following the accessing; acquiring from the memory identification information which is stored in the memory as part of the management information and assigned uniquely to the tape cassette so as to distinguish the tape cassette from other tape cassettes; and acquiring from the magnetic tape identification information which is recorded in a predetermined area on the magnetic tape and supposed to be the same in content as the memory-stored identification information. The method further includes the steps of determining whether there is a match between the memory-stored identification information acquired in the memory-oriented information acquiring step on the one hand and the tape-stored identification information acquired in the tape-oriented information acquiring step on the other hand, and controlling the recording and/or reproduction of information to and/or from the recording medium at least in accordance with a result of the determination made in the determining step.

The above-described apparatus and method of the invention are used in combination with the inventive recording medium that is a tape cassette housing a magnetic tape and equipped with a memory which holds management information for managing the writing and reading of information to and from the magnetic tape. The management information stored in the memory includes identification information which is uniquely assigned to each tape cassette so as to distinguish the cassette from other tape cassettes. The same identification information is supposed to be recorded in a predetermined area on the magnetic tape.

In operation, the inventive apparatus using the inventive method acquires the identification information from both the memory and the magnetic tape in the tape cassette loaded into the apparatus, to determine whether there is a match between the two sets of identification information. Subsequent write and read operations to and from the storage medium (tape cassette) are controlled at least in accordance with the result of the determination.

Since the identification information stored in the memory is unique to each tape cassette, a match detected between the memory-stored identification information and the tape-stored identification information ascertains that the memory of this tape cassette is the same memory to which the information was initially written upon manufacture. That is, the consistency in identification information between the magnetic tape and the memory helps verify that the tape cassette has not been tampered with, e.g., that the memory has not been illicitly replaced.

BRIEF DESCRIPTION OF THE DRAWINGS

Further objects and advantages of this invention will become apparent upon a reading of the following description and appended drawings in which:

FIG. 4 is a perspective view of the inventive tape cassette;

FIGS. 6A, 6B, 6C and 6D are explanatory views showing a structure of data recorded on a magnetic tape;

FIGS. 8A, 8B and 8C are explanatory views illustrating an area structure on a magnetic tape;

FIG. 9 is an explanatory view indicating an MIC data structure according to the invention;

FIG. 10 is an explanatory view presenting a manufacture part of the MIC data structure according to the invention;

FIG. 12 is an explanatory view showing another typical system log according to the invention;

FIG. 13 is an explanatory view listing definitions of a system log vender data type number included in the system log;

FIG. 14 is an explanatory view of system log vender data included in the system log.

DETAILED DESCRIPTION OF THE PREFERRED EMBODIMENTS

Figure 3A:
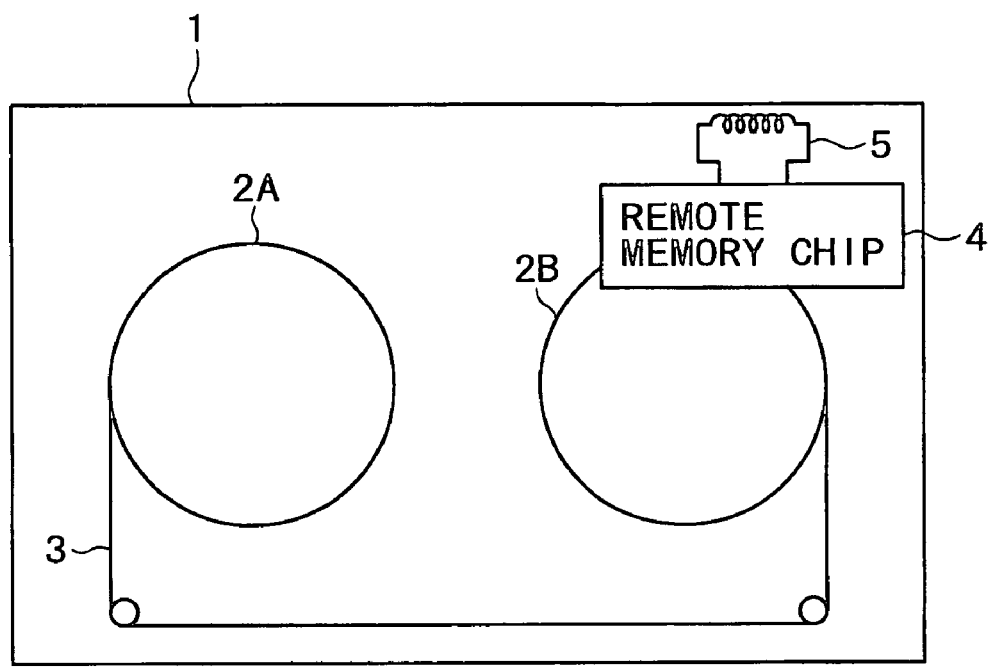
FIGS. 3A and 3B are explanatory views outlining an internal structure of a tape cassette embodying the invention.

Preferred embodiments of this invention will now described with reference to the accompanying drawings. This applicant proposed in the past a number of inventions regarding a nonvolatile memory-equipped tape cassette and a tape drive apparatus (tape streamer drive) capable of recording and reproducing digital data to and from the memory-equipped tape cassette. This invention submitted by the same applicant applies to improvements of the memory-equipped tape cassette and tape streamer drive. The nonvolatile memory attached to the tape cassette according to the invention may be called an MIC (memory in cassette). The description below will be made under the following headings:

1. Structure of the tape cassette
2. Structure of the remote memory chip
3. Structure of the tape streamer drive
4. Magnetic tape format
5. MIC data structure
6. Data structure of system logs on the magnetic tape
7. Fraud preventing measures 1. Structure of the Tape Cassette The tape cassette for use with the tape streamer drive of this invention is described below with reference to FIGS. 3A, 3B and 4. FIG. 3A conceptually depicts an internal structure of a tape cassette equipped with a remote memory chip. Inside the tape cassette 1 are reels 2A and 2B as illustrated, and a magnetic tape 3 with a tape width of 8 mm is wound around the reels.

The tape cassette 1 contains the remote memory chip 4 incorporating a nonvolatile memory and its control circuits. The remote memory chip 4 is furnished with an antenna 5 that allows the chip 4 to communicate data wirelessly with a remote memory interface 30 of the tape streamer drive, to be discussed later.

The remote memory chip 4 accommodates diverse items of information about each tape cassette: manufacture information, serial number information, a tape thickness, a tape length, a tape material, a history of past uses of recorded data in each of partitions formed along the tape, and user information. These items of information will be described later in more detail. In this specification, the diverse kinds of information held in the remote memory chip 4 are collectively called "management information" because they are used primarily in managing the writing and reading of data to and from the magnetic tape 3.

As outlined above, the nonvolatile memory housed in the tape cassette enclosure stores management information, and the tape streamer drive for use with the tape cassette has the interface for writing and reading relevant management information to and from the nonvolatile memory in connection with write and read operations of data to and from the magnetic tape. This setup permits efficient data recording and reproduction to and from the magnetic tape 3.

Illustratively, the magnetic tape need not be rewound to the tape top upon loading or unloading of the tape cassette. That is, the tape cassette can be loaded or unloaded halfway through the ongoing operation. Data may be edited by updating the management information in the nonvolatile memory as needed. Furthermore, it is easy to form a large number of partitions along the tape and manage them appropriately.

If the tape cassette is designed for some special use, the internal nonvolatile memory inside is arranged to accommodate, as part of management information, use type information representative of the specific use. This arrangement eliminates the need illustratively to form identification holes on the tape cassette enclosure for use identification purposes. Size constraints of the tape cassette enclosure put a physical limit to the number of identification holes that may be formed on the enclosure. On the side of the tape streamer drive, it is not feasible to include a mechanical detection facility for detecting each and every identification hole that could be formed; the holes for identifying numerous uses cannot be dealt with physically. By contrast, a large number of tape cassette uses can be recognized if the management information in the nonvolatile memory is arranged to include relevant information representing the use types in effect, as mentioned above.

Figure 3B:
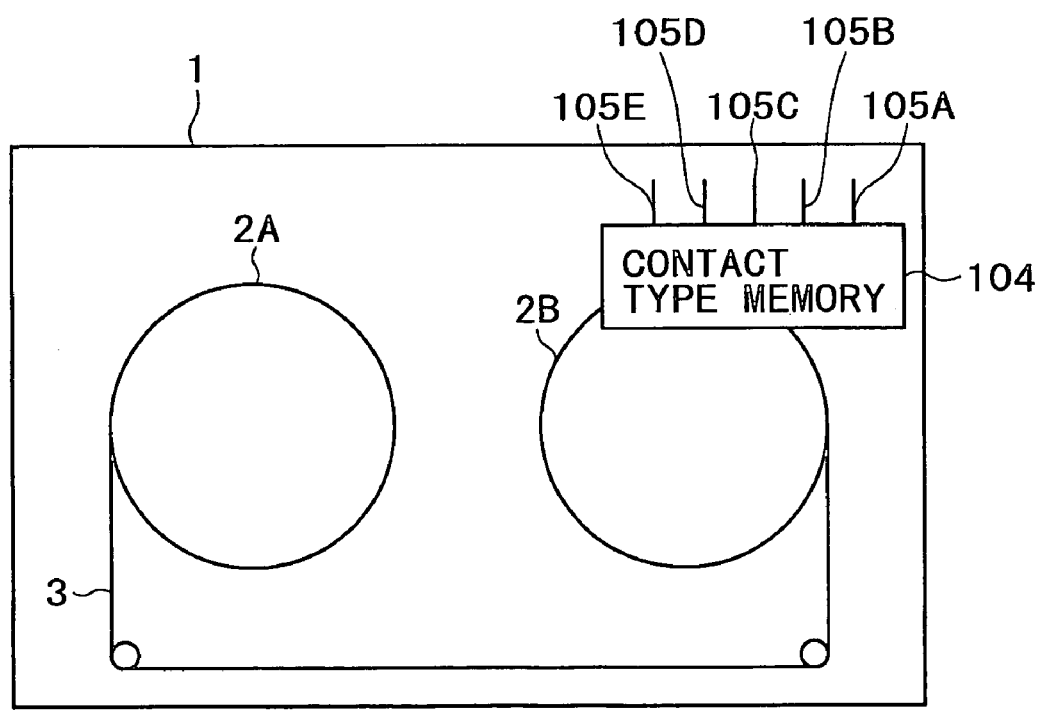

FIG. 3B shows a tape cassette 1 incorporating a contact type memory 104 (nonvolatile memory). In this setup, a module of the contact type memory 104 has five terminals 105A, 105B, 105C, 105D and 105E serving as a power supply terminal, a data input terminal, a clock input terminal, a grounding terminal, and a reserved terminal respectively. The contact type memory 104 stores the same management information as the remote memory chip 4 described above.

In this specification, the nonvolatile memory housed in the tape cassette is called the MIC as mentioned above. According to the invention, as can be understood from the above description, there exist two kinds of MIC: remote memory chip 4, and contact type memory 104. In the description that follows, the remote memory chip 4 and contact type memory 104 are collectively called the MIC if there is no specific need to distinguish the two.

FIG. 4 depicts an external view of the tape cassette 1 shown in FIG. 3A or 3B. The enclosure as a whole is made up of an upper case 6a, a lower case 6b, and a guard panel 8. The structure is basically the same as that of a tape cassette for use by the ordinary 8-mm VTR.

In proximity to a label face 9 on one side of the tape cassette 1 is a terminal block 106. This is a block that accommodates electrodes of the tape cassette incorporating the contact type memory 104 shown in FIG. 3B. Specifically, the block has terminal pins 106A, 106B, 106C, 106D, and 106E connected respectively to the terminals 105A, 105B, 105C, 105D, and 105E of the memory indicated in FIG. 3B. That is, the tape cassette 1 having the contact type memory 104 exchanges data signals with the tape streamer drive through the terminal pins 106A, 106B, 106C, 106D, and 106E in physical contact with their counterparts of the drive.

Obviously, no terminal pins are needed for the tape cassette having the noncontact remote memory chip 4 as shown in FIG. 3A. Still, the tape cassette has a dummy terminal block 106 to maintain outside shape integrity that ensures compatibility with the tape streamer drive.

Although not shown, a label-like noncontact remote memory chip has been known as part of the related art. The label incorporating a remote memory chip may be attached to a suitable location on the enclosure of the tape cassette 1. When the tape cassette 1 is loaded into the tape streamer drive 10, the remote memory chip pasted on the cassette can communicate with a memory communication block of the drive 10.

2. Structure of the Remote Memory Chip

Figure 5:
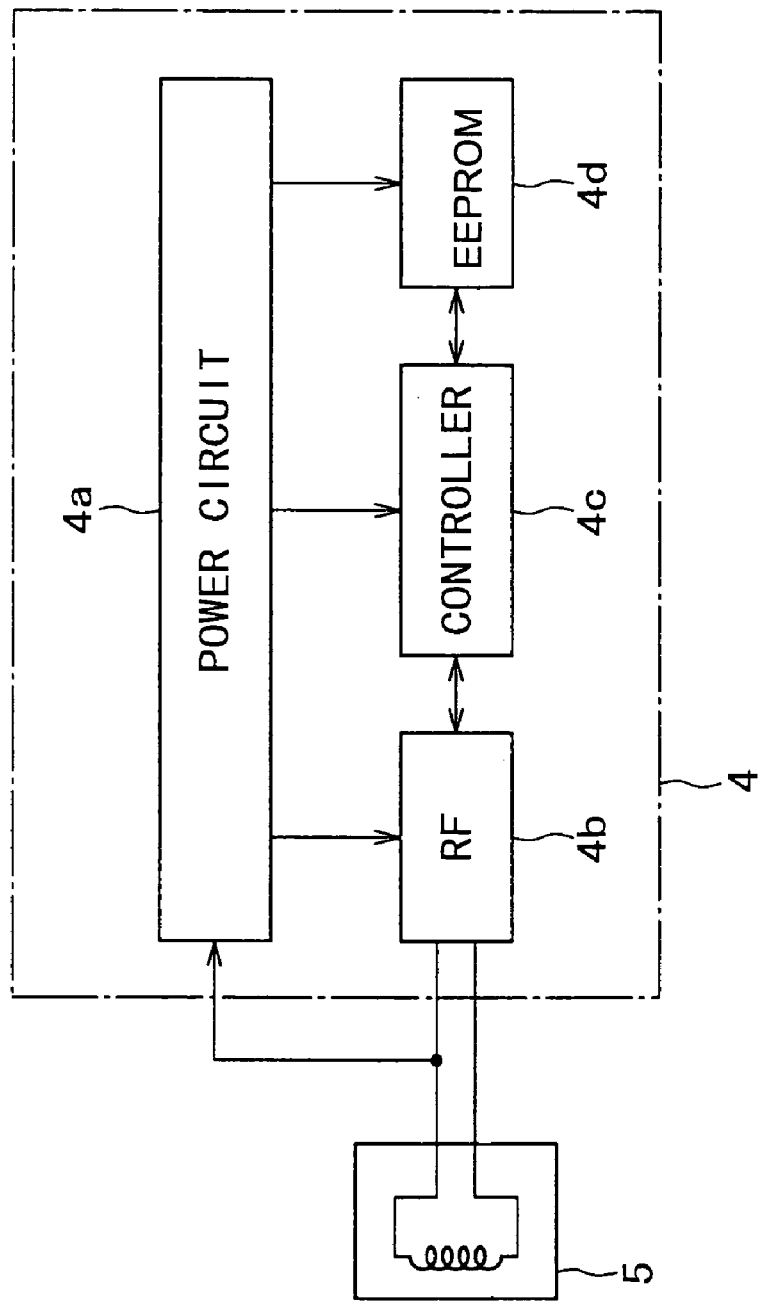
FIG. 5 is a block diagram of a remote memory chip included in the inventive tape cassette.

FIG. 5 shows an internal structure of the remote memory chip 4. Illustratively, the remote memory chip 4 as a semiconductor IC includes a power circuit 4*a*, an RF processor 4*b*, a controller 4*c*, and an EEPROM 4*d* as shown in FIG. 5. The remote memory chip 4 is mounted illustratively on a printed circuit board secured inside the tape cassette 1. A copper foil portion of the printed circuit board constitutes the antenna 5.

The remote memory chip 4 is powered from the outside in noncontact fashion. Communication with the tape streamer drive 10, to be described later, utilizes a carrier of, say, 13 MHz. When radio waves from the tape streamer drive 10 are received by the antenna 5, the power circuit 4*a* converts the 13-MHz carrier into direct currents. The DC power thus generated is supplied to the RF processor 4*b*, controller 4*c*, and EEPROM 4*d* as their operating power.

The RF processor 4*b* demodulates incoming (received) information and modulates outgoing information. The controller 4*c* decodes signals received from the RF processor 4*b* and controls execution of processes reflecting the decoded information (commands), such as write and read operations to and from the EEPROM 4*d*.

That is, the remote memory chip 4 is switched on upon receipt of radio waves from the tape streamer drive 10 or from a library device 50. The controller 4*c* executes the processes designated by commands superposed on the carrier, thereby managing data in the EEPROM 4*d* which is a nonvolatile memory.

3. Structure of the Tape Streamer Drive

Figure 1:
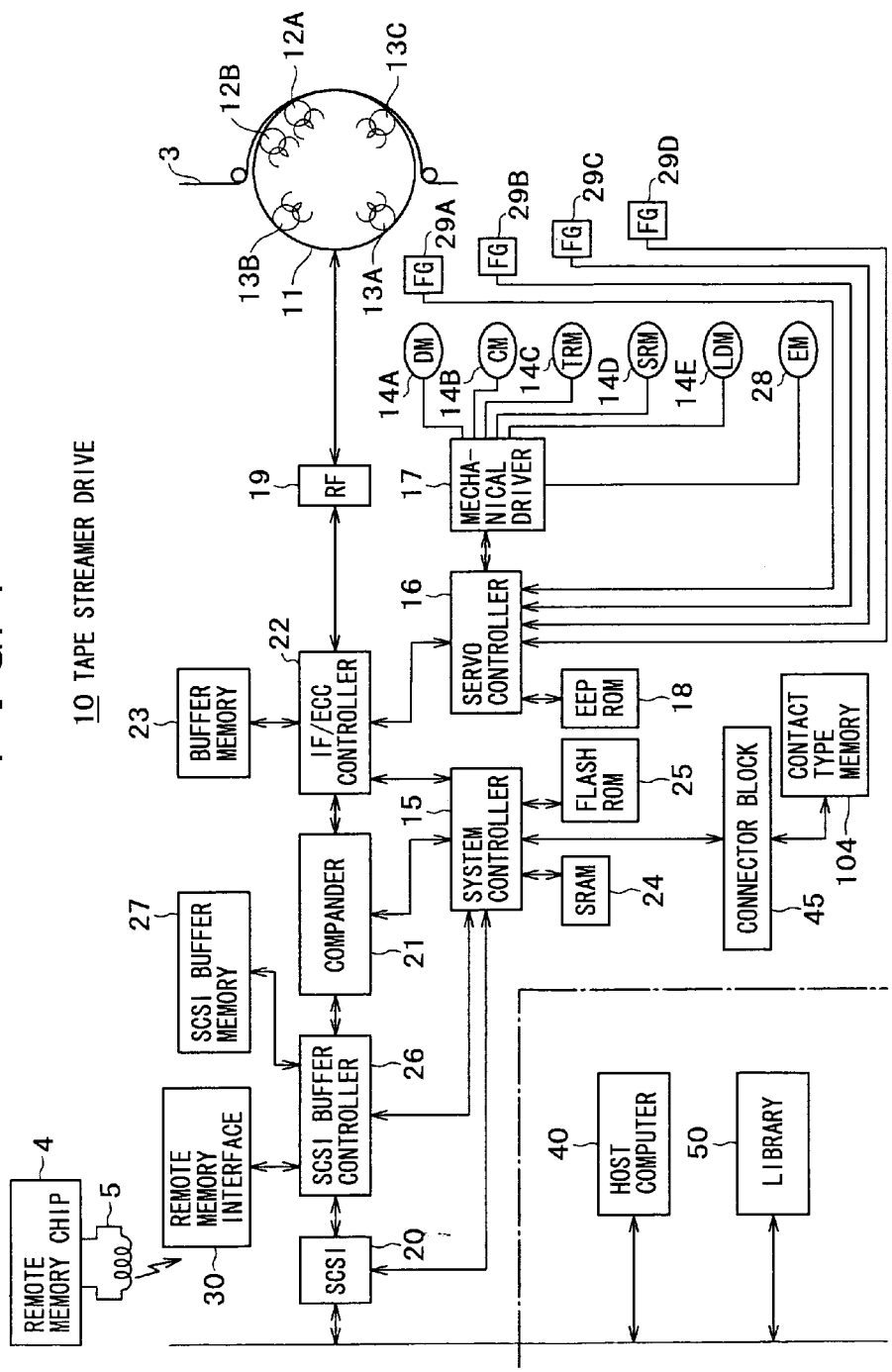
FIG. 1 is block diagram of a tape streamer drive embodying this invention.

Described below with reference to FIG. 1 is a typical structure of the tape streamer drive 10 compatible with the tape cassette 1 equipped with the remote memory chip 4 shown in FIG. 3A. The tape streamer drive 10 operates on the helical scan principle in recording and reproducing data to and from the magnetic tape 3 in the tape cassette 1.

As shown in FIG. 1, a rotary drum 11 illustratively has two write heads 12A and 12B, and three read heads 13A, 13B and 13C. The write heads 12A and 12B are structured so that two gaps with different azimuth angles are located in close proximity to each other. The read heads 13A, 13B and 13C are disposed to have their own azimuth angles.

The rotary drum 11 is rotated by a drum motor 14A. The magnetic tape 3 drawn out of the tape cassette 1 is wound around the rotary drum 11, fed by a capstan motor 14B and pinch rollers, not shown. As mentioned above, the magnetic tape 3 is wound around the reels 2A and 2B which are rotated by reel motors 14C and 14D in forward and backward directions, respectively.

A loading motor 14E drives a loading mechanism, not shown, to load and unload the magnetic tape 3 onto and away from the rotary drum 11. An eject motor 28 drives a tape cassette loading mechanism to load and to eject the tape cassette 1.

The drum motor 14A, capstan motor 14B, reel motors 14C and 14D, loading motor 14E, and eject motor 28 are all driven by power fed from a mechanical driver 17. The mechanical driver 17 drives these motors under control of a servo controller 16. The servo controller 16 controls the rotating speeds of the motors to effect diverse operations: normal tape run for recording or reproduction, tape run for high-speed reproduction, fast forward, and rewind. An EEPROM 18 retains constants and other related data for servo control by the servo controller 16 over the motors.

The drum motor 14A, capstan motor 14B, T reel motor 14C, and S reel motor 14D are each furnished with a frequency generator (FG). These frequency generators detect revolution information about the motors. The detected information is used in servo control by the servo controller 16. More specifically, there are provided a drum FG 29A, a capstan FG 29B, a T reel FG 29C, and an S reel FG 29D for generating frequency pulses in synchronism with the revolutions of the drum motor 14A, capstan motor 14B, T reel motor 14C, and S reel motor 14D respectively. The generator output (i.e., FG pulses) is fed to the servo controller 16.

Given the FG pulses, the servo controller 16 determines the rotating speed of each of the motors, finds an error between a target rotating speed and the actual rotating speed detected of each motor, and applies power to the mechanical driver 16 in accordance with the detected error in a closed-loop rotating speed control setup. In this manner, the servo controller 16 controls the revolutions of the motors in compliance with their target rotating speeds during such operations as normal tape run for recording or reproduction, high-speed search, fast forward, and rewind.

The servo controller 16 is connected bidirectionally with a system controller 15 that controls the system as a whole through an interface controller/ECC formatter 22 (called the IF/ECC controller hereunder).

The tape streamer drive 10 uses an SCSI interface 20 for data input and output. At the time of data recording, for example, data are input consecutively from a host computer 40 through the SCSI interface 20 in data units of a fixed-length record. The input data are sent to a compander (compressor/expander) 21 via an SCSI buffer controller 26 that controls the SCSI interface 20 in data transfers. An SCSI buffer memory 27 is provided as buffering means used by the SCSI buffer controller 26 in causing the SCSI interface 20 to attain necessary transfer rates. The SCSI buffer controller 26 supplies relevant command data to the remote memory interface 30, to be described later, and generates a clock signal for the interface 30 during operation.

This tape streamer drive system also has a mode in which the host computer 40 transmits data in units of a variable collective data length.

The compander 21 compresses input data as needed in a predetermined format. Illustratively, where LZW compression is adopted as the compression method, character strings that have been processed so far are assigned unique codes and stored in the form of a dictionary. When new character strings are input, they are compared with the existing content of the dictionary. If any character strings in the input data match the coded character strings in the dictionary, they are replaced with the corresponding dictionary codes. All unmatched input character strings are assigned new codes and entered into the dictionary. In this manner, input character string data are entered successively into the dictionary and all data that match the existing string data are replaced with the matching codes for data compression.

The output of the compander 21 is sent to the IF/ECC controller 22 which, in its control operation, places the received compander 21 output temporarily into a buffer memory 23. The data stored in the buffer memory 23 are ultimately processed under control of the IF/ECC controller 22 in units of a fixed length equivalent to 40 tracks of the magnetic tape called a group. The resulting data are subjected to an ECC formatting process.

The ECC formatting process involves supplementing write data (data to be written) with ECC (error-correcting code) and modulating the coded data in a manner complying with magnetic recording. The processed data are fed to the RF processor 19.

Given the write data, the RF processor 19 generates write signals by submitting the data to such processes as amplification and write equalizing, and sends the generated write signals to the write heads 12A and 12B. The write heads 12A and 12B supplied with the write signals write the data to the magnetic tape 3.

What follows is a brief description of a data read operation. Recorded data are read from the magnetic tape 3 by the read heads 13A and 13B as RF read signals. The read output is subjected to processes such as read equalizing, read clock generation, binarization, and decoding (e.g., Viterbi decoding) by the RF processor 19.

The signals thus read out are fed to the IF/ECC controller 22 first for error correction. After being placed temporarily in the buffer memory 23, the processed data are read therefrom in a suitably timed manner and sent to the compander 21.

If the system controller 15 determines that the data have been compressed, the compander 21 expands the data accordingly; if the system controller 15 finds that the data are not compressed, then the compander 21 allows the data to be output unmodified. The output data from the compander 21 are output to the host computer 40 as reproduced data via the SCSI buffer controller 26 and SCSI interface 20.

FIG. 1 also shows the remote memory chip 4 housed in the tape cassette 1. When the tape cassette 1 is loaded into the tape streamer drive, the remote memory chip 4 enters into a state of readiness to exchange data with the system controller 15 in a noncontact manner via the remote memory interface 30.

Figure 2:
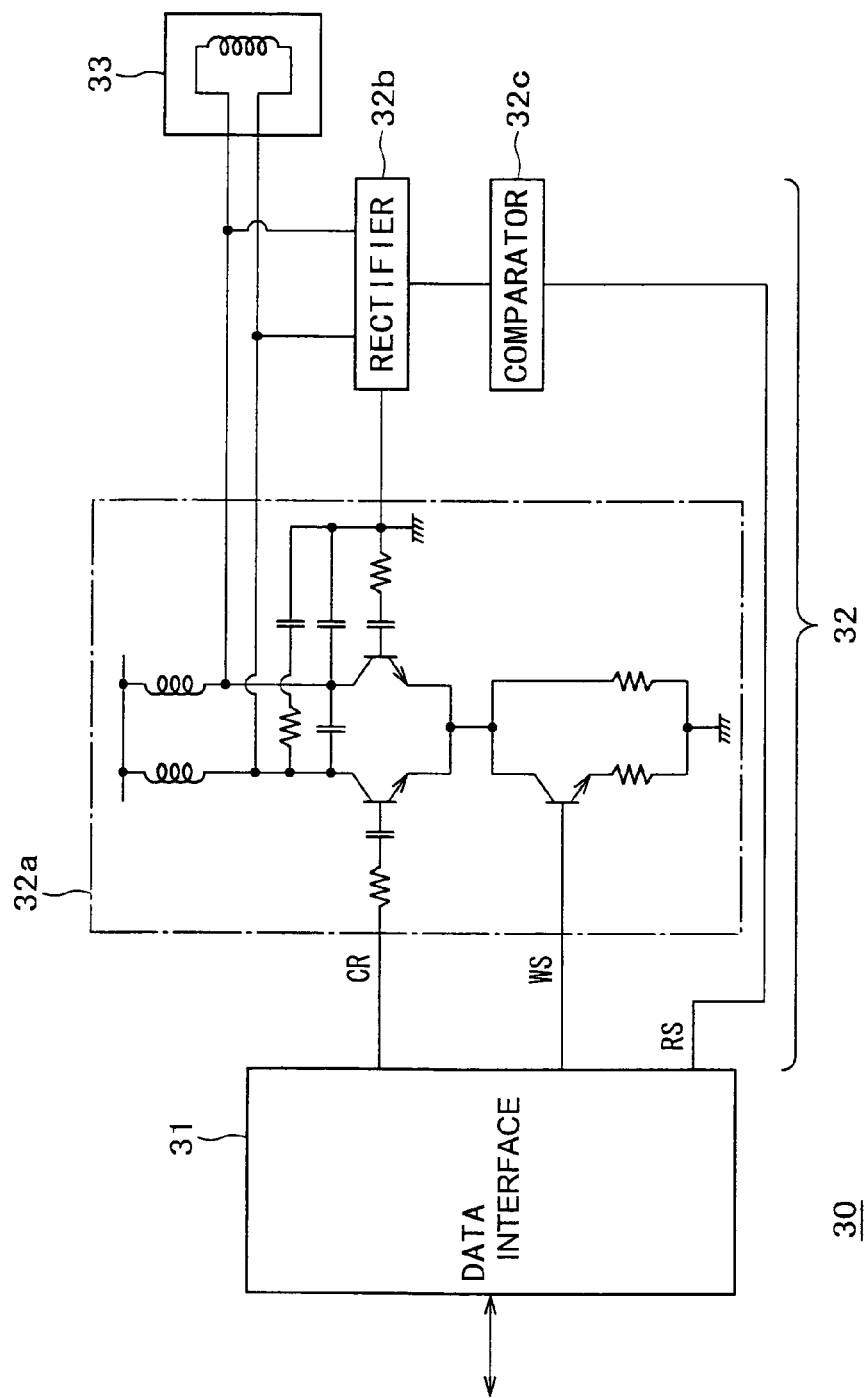
FIG. 2 is a block diagram of a remote memory interface included in the inventive tape streamer drive.

FIG. 2 depicts a typical structure of the remote memory interface 30. A data interface 31 is provided to permit data exchanges with the system controller 15. As will be discussed later, a data transfer to the remote memory chip 4 takes place in the form of a command from the apparatus and an acknowledgment of that command by the remote memory chip 4. When the system controller 15 issues a command to the remote memory chip 4, the data interface 31 receives command data and a clock signal from the SCSI buffer controller 26. In keeping with the clock, the data interface 31 feeds the command data to an RF interface 32. The data interface 31 also supplies a carrier frequency CR (13 MHz) to the RF interface 32.

As shown in FIG. 2, the RF interface 32 includes an RF modulator/amplifier 32a that modulates in amplitude (100 kHz) the command (outgoing data) WS and superposes the modulated command onto the carrier frequency CR. After the modulation and amplification, the resulting signal is sent to an antenna 33.

The RF modulator/amplifier 32a causes the command data to be transmitted wirelessly from the antenna 33 to the antenna 5 inside the tape cassette 1. As discussed above with reference to FIG. 5, the circuitry in the tape cassette 1 is switched on upon receipt of the command data by the antenna 5. In keeping with what is designated by the command, the controller 4c carries out the corresponding operation. Illustratively, the data transmitted along with a write command are written to the EEPROM 4d under control of the controller 4c.

When the remote memory interface 30 issues a command, the remote memory chip 4 acknowledges it. More specifically, the controller 4c of the remote memory chip 4 causes the RF processor 4b to modulate and amplify acknowledgment data before transmitting the acknowledgment from the antenna 5.

Upon receipt of the acknowledgment by the antenna 33, the received signal is rectified by a rectifier 32b before being demodulated by a comparator 32c into data. The demodulated data are sent through the data interface 31 to the system controller 15. Illustratively, if the system controller 15 issues a read command to the remote memory chip 4, the remote memory chip 4 returns data retrieved from the EEPROM 4d along with a code acknowledging the received command. The acknowledgment code and the retrieved data are received and demodulated by the remote memory interface 30 before being forwarded to the system controller 15.

As described, the tape streamer drive 10 using the remote memory interface 30 can gain access in noncontact fashion to the remote memory chip 4 inside the tape cassette 1. In the noncontact data exchanges above, the data are modulated in amplitude at 100 kHz and superposed onto the 13-MHz carrier. The initial data are packetized for the exchange. More specifically, the data in the form of a command and an acknowledgment are supplemented with a header, parity code and other necessary information before being packetized. The packetized data are subjected first to code conversion and then to modulation, whereby stable RF signals are generated for transmission and reception. The techniques for implementing the noncontact interface described above were submitted earlier by this applicant and are granted a patent (Japanese Patent No. 2550931).

An SRAM 24 and a flash ROM 25 shown in FIG. 1 hold data for use by the system controller 15 in various processes. For example, the flash ROM 25 retains constants used for control purposes. The SRAM 24 is utilized as a work memory or as a memory that accommodates data from the MIC (remote memory chip 4 or contact type memory 104), data to be written to the MIC, mode data set in units of a tape cassette, and various flag data. The SRAM 24 also serves to let the stored data therein be operated on.

The flash ROM 25 provided as firmware retains such diverse items of information as data write/read retry counts, write current values for use by the RF processor 19, and equalizer characteristics. When the tape cassette is loaded, the tape streamer drive 10 can execute controls based on the settings held in this firmware.

The SRAM 24 and flash ROM 25 may be furnished as internal memories of a microcomputer constituting the system controller 15. Part of the areas in the buffer memory 23 may alternatively be used as a work memory.

As shown in FIG. 1, the tape streamer drive 10 and host computer 40 communicate information with each other through the SCSI interface 20 in the manner described above. The system controller 15 receives communications from the host computer 40 through the use of SCSI commands. The SCSI interface may alternatively be replaced by some other suitable interfacing arrangements such as an IEEE 1394 interface.

Where the tape cassette 1 incorporating the contact type memory 104 shown in FIG. 3B is employed as the target tape cassette, the tape streamer drive 10 is provided with a connector block 45 that writes and reads data to and from the memory 104. The connector block 45 is shaped to fit the terminal block 106 shown in FIG. 4. When coupled to the terminal block 106, the connector block 45 electrically connects the five terminals 105A, 105B, 105C, 105D and 105E of the contact type memory 104 to the system controller 15 (i.e., to a memory connection port of the system controller).

When the electrical connection is established, the system controller 15 can access the contact type memory 104 of the loaded tape cassette 1 through the connector block 45 and terminal block 106. If the connector block 45 and terminal block 106 are poorly connected, the loading motor 14E may drive the loading mechanism to slightly shift the tape cassette 1 from its loaded position. Such readjustments are carried out as needed to establish proper physical contacts between the two blocks.

4. Magnetic Tape Format

What follows is a general description of a data format along the magnetic tape 3 in the tape cassette 1 to and from which the tape streamer drive 10 writes and reads data.

FIGS. 6A through 6D illustrate a typical structure of data recorded on the magnetic tape 3. FIG. 6A schematically shows a single magnetic tape 3. With this embodiment of the invention, each magnetic tape 3 may be divided into partitions for use on a partition-by-partition basis as depicted in FIG. 6A. Up to 256 partitions may be formed per tape and managed using partition numbers (partitions #0, #1, #2, etc.).

With this embodiment, data can be written and read to and from each partition independently of the other partitions. Illustratively, in a single partition depicted in FIG. 6B, data are shown recorded in units of a fixed length called a group indicated in FIG. 6C. In other words, data are written to the magnetic tape 3 in groups.

One group is equivalent to a data amount of 20 frames. One frame is formed by two tracks as shown in FIG. 6D. The two tracks constituting each frame are a plus azimuth track and a minus azimuth track contiguous to each other. One group is thus made up of 40 tracks.

Figure 7A:
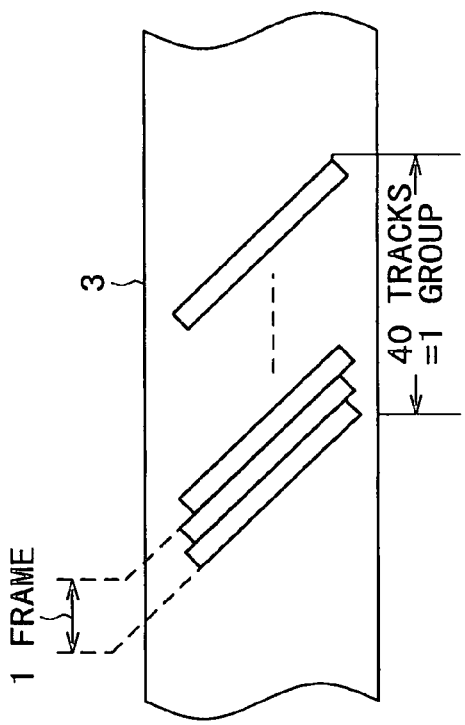
FIGS. 7A, 7B and 7C are schematic views depicting a data structure of a single track.
Figure 7B:
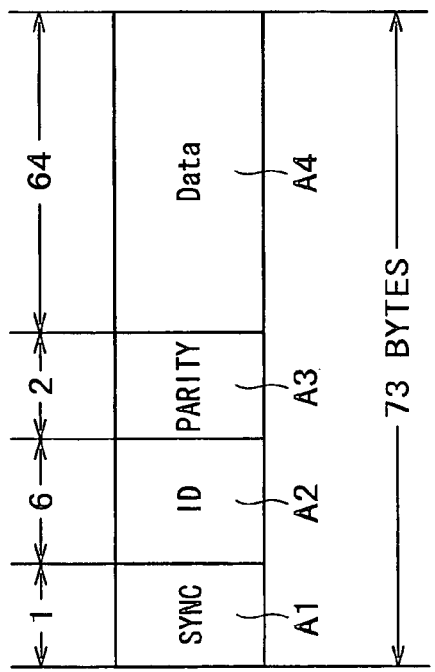

The single-track data structure in FIG. 6D is detailed in FIGS. 7A and 7B. FIG. 7A shows a data structure per block. One block is made up of a one-byte SYNC data area Al in the leftmost position, followed by a six-byte ID area A2 for use in searches, a two-byte parity area A3 for ID data error correction, and a 64-byte data area A4, in that order.

The data per track shown in FIG. 7B are composed of 471 blocks in total. Each track has four-block margin areas All and A19 at both ends. The margin areas All and A19 are followed and preceded respectively by ATF areas A12 and A18 for tracking control. The AFT areas A12 and A18 are followed and preceded respectively by parity areas A13 and A17. Each parity area is formed by 32 blocks.

Figure 7C:
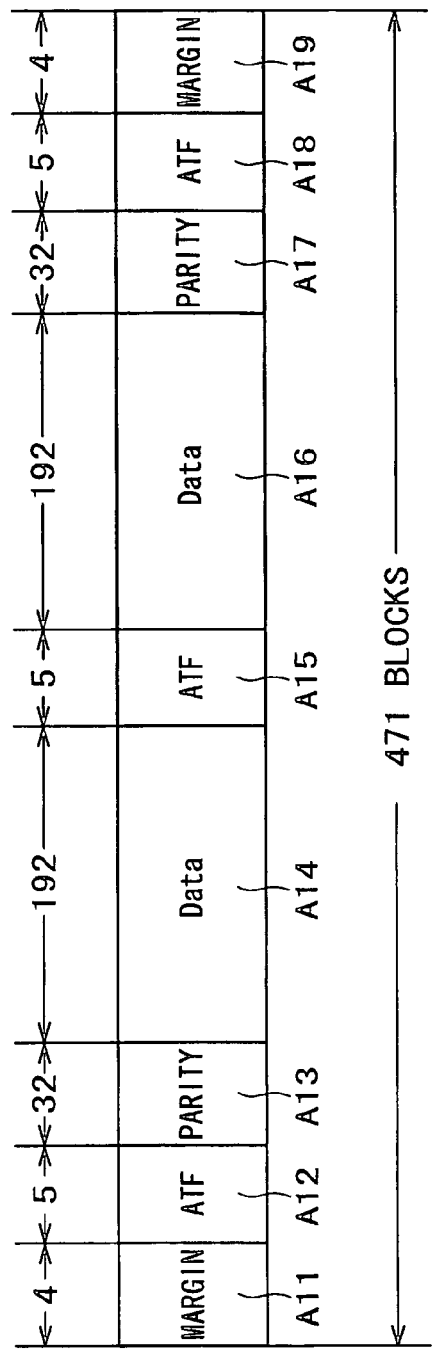

In the middle of a track is disposed an ATF area A15. The ATF areas A13, A15 and A18 are made up of five blocks each. A 192-block data area A14 is formed between the parity areas A13 and the ATF area A15, and another 192-block data area A16 between the ATF area A15 and the parity area A17. Of the 471 blocks making up a single track, 384 blocks constitute the data areas A14 and A16 (192=2=384 blocks). One group composed of 40 tracks (=20 frames) as described above is physically recorded on the magnetic tape 3 as illustrated in FIG. 7C.

The magnetic tape 3 discussed above with reference to FIGS. 6A through 7C has data recorded thereon in an area structure depicted in FIGS. 8A, 8B and 8C. This representative structure is assumed to have N partitions numbered from #0 to #N−1.

As shown in FIG. 8A, the top of the magnetic tape is physically furnished with a leader tape, followed by a device area for use in the loading and unloading of the tape cassette. The beginning of the device area is called a PBOT (physical beginning of tape). The device area is followed by a reference area with regard to partition #0 and a system area that holds a tape use history and related data (the reference area and the system area are collectively called the system area hereunder). The system area is followed by a data area. The beginning of the system area is called an LBOT (logical beginning of tape).

The system area, as shown magnified in FIG. 8C, includes a reference area, a position tolerance band No. 1, a system preamble, a system log, a system postamble, a position tolerance band No. 2, and a vender group preamble.

The data area subsequent to the system area is shown magnified in FIG. 8B. As illustrated, at the top of the data area is written a vender group indicating information about the vender that first created and supplied data. The vender group is followed by a series of groups each structured as illustrated in FIG. 6C. In this example, group 1 through group (n) are shown to be formed consecutively. The last group (n) is followed by an amble frame.

Subsequent to the data area is an EOD (end of data) area indicating the end of the data area for the partition in question, as shown in FIG. 8A. If there were only one partition, the END of that partition #0 would represent an LEOT (logical end of tape). Since there are N partitions in this case, an optional device area is provided following the EOD of partition #0.

The device area subsequent to the PBOT is an area for use in the loading and unloading of the tape cassette with regard to partition #0. The optional device area at the end of partition #0 serves as an area for use in the loading and unloading of the tape cassette with respect to partition #1.

Partition #1 has the same area structure as partition #0. At the end of partition #1 is formed an optional device area for use in the loading and unloading of the tape cassette with regard to the next partition #2. The subsequent partitions up to partition #(N−1) are each given the same structure.

The last partition #(N−1) has no need for an optional device area and is not furnished therewith. The EOD of partition #(N−1) represents the LEOT (logical end of tape.). A PEOT (physical end of tape) denotes the position where the physical tape or the partition in question physically ends.

5. MIC data structure

The structure of data to be stored in the MIC (remote memory chip 4 or contact type memory 104) will now be described. If the MIC is the remote memory chip 4, data are written to the EEPROM 4d. The contact type memory 104 includes illustratively a nonvolatile memory, not shown, which is equivalent to the EEPROM 4d and which has the data written thereto.

FIG. 9 schematically shows a typical structure of data held in the MIC. The storage area of the MIC has an MIC header and a memory free pool where diverse kinds of management information are written, such as items of information about manufacture of the tape cassette, tape information in effect upon initialization, and partition-wise information.

The MIC header is topped by a 96-byte manufacture part that primarily retains various items of information about manufacture of the tape cassette in question. The manufacture part is followed by a 64-byte signature, a 32-byte cartridge serial number, a 16-byte cartridge serial number CRC, a 16-byte scratch pad memory, a 16-byte mechanism error log, a 16-byte mechanism counter, and a 48-byte last 11 drive list, in that order. A 16-byte drive initialize part subsequent to the last 11 drive list mainly accommodates information in effect upon initialization.

A 112-byte volume information area subsequent to the drive initialize part holds basic management information about the tape cassette as a whole. The volume information is followed by a 64-byte accumulative system log that stores information about a history accumulated since the manufacture of the tape cassette. At the end of the MIC header is a 528-byte volume tag.

The memory free pool is an area to which management information can be added. This is an area where various items of information are stored or updated as needed in the course of write or read operations. Data are written to the memory free pool in units of data items called collectively a cell.

Where partitions are formed along the magnetic tape 3, partition information cells #0, #1, etc., are written as management information corresponding to the established partitions starting from the top of the memory free pool. That is, there are as many partition information cells written to the memory free pool as the number of partitions formed along the magnetic tape 3.

As shown in FIGS. 8A, 8B and 8C, the system log provided in the system area for each of partitions #0, #1, etc., along the magnetic tape is arranged to hold the same information as that written to the partition information cells #0, #1, etc., in the MIC.

At the end of the memory free pool is written a super-high speed search map cell that constitutes map information for use in super-high speed searches. The super-high speed search map cell is preceded by a user volume note cell and user partition note cells. The user volume note cell is made up of information such as a comment entered by the user about the tape cassette as a whole. The user partition information cells hold such information as comments entered by the user about each of the partitions. These items of information are stored only when designated by the user; their storage in the memory is optional. Any intermediate area where such information is not written is left unused as a memory free pool area for future storage of information.

The manufacture part in the MIC header is structured illustratively as depicted in FIG. 10. The data items making up the manufacture part have their sizes in bytes shown in the rightmost column of FIG. 10. The manufacture part is topped by a one-byte manufacture part checksum that holds checksum information about the data in the manufacture part. This information is provided upon manufacture of this tape cassette.

Real data that constitute the manufacture part range from an MIC type to an offset. An indication "Reserved" denotes an area reserved for future storage of data. The same indication will have the same significance in the description that follows.

The MIC type is a data item that indicates the type of the MIC (remote memory chip 4) actually furnished in this tape cassette.

An MIC manufacture date represents the date (and time) of manufacture of this MIC.

An MIC manufacture line name provides information about the name of the line that manufactured the MIC.

An MIC manufacture plant name furnishes information about the name of the plant that manufactured the MIC.

An MIC manufacturer name gives information about the name of the manufacturer that manufactured the MIC.

An MIC name describes information about the name of the vender that marketed the MIC.

A cassette manufacture date, a cassette manufacture line name, a cassette manufacture plant name, a cassette manufacturer name, and a cassette name are data items that describe the corresponding items of information about the tape cassette.

An OEM customer name holds information about the name of an OEM (original equipment manufacturers) customer.

A physical tape characteristic ID denotes information about physical characteristics of the magnetic tape such as material, thickness and length of the tape.

A maximum clock frequency provides information about a maximum clock frequency compatible with the MIC in question.

A block size describes information about a data length characteristic of the MIC (remote memory chip 4). This data item represents the data length in units of which data are transmitted at one time through the remote memory interface 30 and RF interface 32.

An MIC capacity denotes information about the storage capacity of this MIC (remote memory chip 4).

A write protect top address represents the start address of a write-protect area allocated as part of the MIC.

A write protect count indicates the number of bytes in the write-protect area. That is, the write-protect area is allocated in a manner ranging from the start address designated by the write protect top address to the address indicated by this write protect count.

An application ID, shown as a one-byte data item, provides the ID of the application which, in this context, means a tape cassette type.

A two-byte area following the application ID serves as an offset.

6. Data Structure of System Logs on the Magnetic Tape

Figure 11:
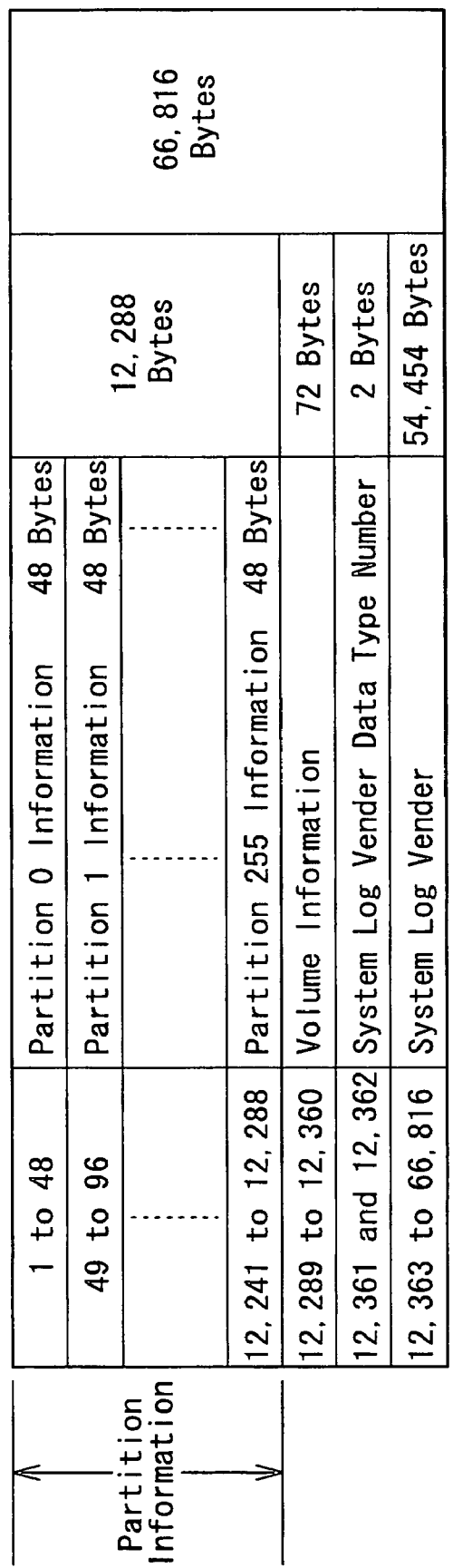
FIG. 11 is an explanatory view showing a typical system log according to the invention.

What follows is a description of the system log written in the system area on the magnetic tape 3. FIGS. 11 and 12 depict typical overall system log data structures. The system log shown in each of these figures includes system log vender data, as well as information about the partition to which the system log belongs. The system log vender data are made up of data necessary for the manufacturer (vender) that manufactured this tape cassette to manage the tape cassette and its MIC and to provide them with the vender's proprietary utility.

FIG. 11 depicts a data structure of the system log called type 0. In the case of a multiple partition tape format in which a plurality of partitions are allowed to be formed, the system log type 0 represents the structure of the system log furnished in the top partition. In the example of FIG. 8, the system log type 0 constitutes the system log for partition #0. In practice, a system made up of the tape streamer drive and the tape cassette according to this invention may adopt a single partition format involving only one partition formed on the magnetic tape. In this case, the system log is also constituted by the system log type 0 shown in FIG. 11.

FIG. 12 shows a data structure of the system log called type 1. Where the multiple partition tape format is in effect allowing a plurality of partitions to be formed, the system log type 1 represents the structure of the system log furnished in the partition following the top partition and in each of the subsequent partitions.

The system log type 0 in FIG. 11 has a total area of 66,816 bytes. The data size of the entire system log is determined in units of frames (see FIG. 6D) on the magnetic tape. In practice, hundreds of frames each taking on the structure of FIG. 11 are written consecutively on the tape to make up the system log. That is, the same system log data structured as shown in FIG. 11 are written many times over to constitute the system log area on the magnetic tape. This also applies to the system log type 1 depicted in FIG. 12.

In the system log type 0, a 12,228-byte area ranging from byte location 1 to byte location 12,228 makes up a partition information area that stores information about the partitions formed along the magnetic tape. As discussed above with reference to FIG. 6, the system embodying this invention may establish up to 256 partitions in a multiple partition format setup. In that setup, the partition information area is divided into 48-byte areas from byte location 1 onward, i.e., a partition 0 information area through a partition 255 information area. The partition 0 information area through the partition 255 information area each accommodate information regarding each of partitions #0 through #255. In a single partition format setup with only one partition allocated on the magnetic tape, only the partition 0 information area ranging from byte location 1 to byte location 48 is used as the partition information area.

A 72-byte area ranging from byte location 12,289 to byte location 12,360 subsequent to the partition information constitutes a volume information area. The volume information includes diverse kinds of information about the entire tape cassette.

The volume information is followed by a two-byte system log vender data type number area (byte locations 12,361 through 12,362) and a 54,454-byte system vender data area (byte locations 12,363 through 66,816). A value in the system log vender data type number area indicates the data content to be stored into the system log vender data area, as will be described later.

FIG. 12 depicts a data structure of the system log called type 1. As illustrated, the system log type 1 has a total area of 66,816 bytes, the same as the system log type 0. The data size of the entire system log is determined in units of frames formed on the magnetic tape. Hundreds of frames each taking on the structure of FIG. 12 are written consecutively on the tape to make up the system log.

In the system log type 1, a 24,576-byte area ranging from byte location 1 to byte location 24,576 constitutes a partition information area that accommodates 515 consecutive partition N information areas of 48 bytes each. Each of the partition N information areas retains relevant information about the corresponding partition.

The partition information area is followed by a two-byte system log vender data type number ranging from byte location 24,577 to byte location 25,578, and by a 42,238-byte system log vender data area ranging from byte location 24,579 to byte location 66,816, in that order. In this case, as in the case of the system log type 0, the value in the system log vender data type number area indicates the data content to be stored into the system log vender data area.

As illustrated in FIG. 12, the system log type 1 does not have volume information. The absence is attributable simply to a particular formatting scheme used for this example. Alternatively, the system log type 1 may be formatted to accommodate a volume information area as well.

In the system log structured as described above, values that may be set in the system log vender data type number are defined as shown in FIG. 13. The system log vender data type number is allocated a two-byte area that may accommodate a value ranging from 0 to "n."

The value 0 to be set in the system log vender data type number is defined as indicative of "Not in use" as shown in FIG. 13. That is, if the system log vender data type number is set to 0, that means the system log vender data areas shown in FIGS. 11 and 12 are not to be used.

The value 1 to be set in the system log vender data type number is defined as indicative of "Super-high speed search map" as shown. If the system log vender data type number is set to 1, that means the system log vender data area accommodates map data for use in super-high speed searches.

The value 2 to be set in the system log vender data type number is defined as indicative of "MIC manufacture header information." If the system log vender data type number is set to 2, that means the system log vender data area holds MIC manufacture header information.

Any other value than 0 through 3 (to be discussed below) for use as the system log vender data type number is defined as "Reserved" as shown in FIG. 13.

With this embodiment of the invention, the value 3 to be set in the system log vender data type number is newly defined as indicative of "MIC cartridge serial number" as shown in FIG. 13. The MIC cartridge serial number, discussed above with reference to FIG. 9, is a unique serial number that is placed into the data area of each MIC (i.e., of each tape cassette). If the system log vender data type number is set to 3, that means the system log vender data area is supposed to retain the same cartridge serial number as that stored in the MIC.

With this embodiment, the cartridge serial number is copied from the MIC to the system log vender data area on the magnetic tape at the time of initial data recording (e.g., at tape formatting time) at least where the tape cassette containing the tape is designed for a special use (e.g., where a WORM feature-equipped tape cassette is used). That is, the special-use tape cassette is designed to have the same cartridge serial number stored both in the MIC and on the magnetic tape.

The system log vender data to which the cartridge serial number is copied from the MIC is established as a ROM area. It follows that once written to the magnetic tape, the cartridge serial number is managed by the tape streamer drive 10 in a manner inhibiting the user from changing the number.

With the same cartridge serial number kept unchangeable both in the MIC and on the magnetic tape, the two values are acquired from the MIC and magnetic tape and compared whenever the tape cassette is loaded into the drive, as will be described later. If the comparison reveals a mismatch between the two values retrieved from the two components, then it is highly likely that something fraudulent has been committed on the tape cassette, such as illicit replacement of the MIC. If the comparison indicates a match between the retrieved values, then it is deduced that the tape cassette is free of such tampering.

With this embodiment, it is mandatory to copy the cartridge serial number from the MIC to the magnetic tape whenever a write operation is to be performed on the special-use tape. The copying is optional in the case of normal cartridges. Every special-use cartridge with data recorded thereon must have the same cartridge serial number recorded both in the MIC and on the magnetic tape; the normal cartridge may or may not have a cartridge serial number written in the MIC and on the magnetic tape.

FIG. 14 shows a typical structure of the system log vender data in effect when the system log vender data type number is set to 3, with a cartridge serial number written in the MIC and on the magnetic tape. In FIG. 14, the rightmost column "Comments" contains typical data that may be written to the respective data areas indicated.

As shown in FIG. 14, the cartridge serial number is written to the first 32-byte area ranging from location 0 to byte location 31 (offset). This top data area accommodates a 32-digit number spanning 32bytes as illustrated in the "Comments" column.

A one-byte area at the next byte location 32 is allocated as a manufacturer ID area that carries information about the manufacturer. The ensuing one-byte area, at byte location 33, holds a secondary ID as illustrated.

Another one-byte area at byte location 34 retains checksum information about the data stored in the preceding areas ranging from byte location 0 to byte location 33 (MIC cartridge serial number, manufacturer ID, secondary ID). The checksum is illustratively made of a value obtained by exclusive-OR'ing the values at byte locations 0 through 33.

The subsequent area is reserved as indicated, ranging from byte location 35 to byte location 54,453 (in the case of the system log type 0), or from byte location 35 to byte location 42,237 (for the system log type 1). Illustratively, this area as a whole is filled with zeros.

7. Fraud Preventing Measures

When the above-described WORM cartridge is loaded into the tape streamer drive of this embodiment, the recorded areas on the magnetic tape will not be overwritten nor erased. The recorded areas can only be read, and data may be added only to unrecorded areas. That is, the write capability of the drive is restricted to a certain degree with regard to the WORM cartridge.

Since data of high storage value are expected to be recorded on the WORM cartridge as described earlier, the WORM cartridge is required to provide a significantly higher level of security than the normal cartridge. The WORM cartridge is vulnerable to tampering. For example, one fraudulent case might involve a malicious user substituting an illicit memory for the initially furnished MIC in a given WORM cartridge in order to turn the latter into a normally rewritable cartridge. The recorded data on the tape could then be falsified. Another fraudulent case might involve illegally switching the MICs between special-purpose cartridges (tape cassettes) so that their original uses could be switched or otherwise diverted abusively.

Figure 15:
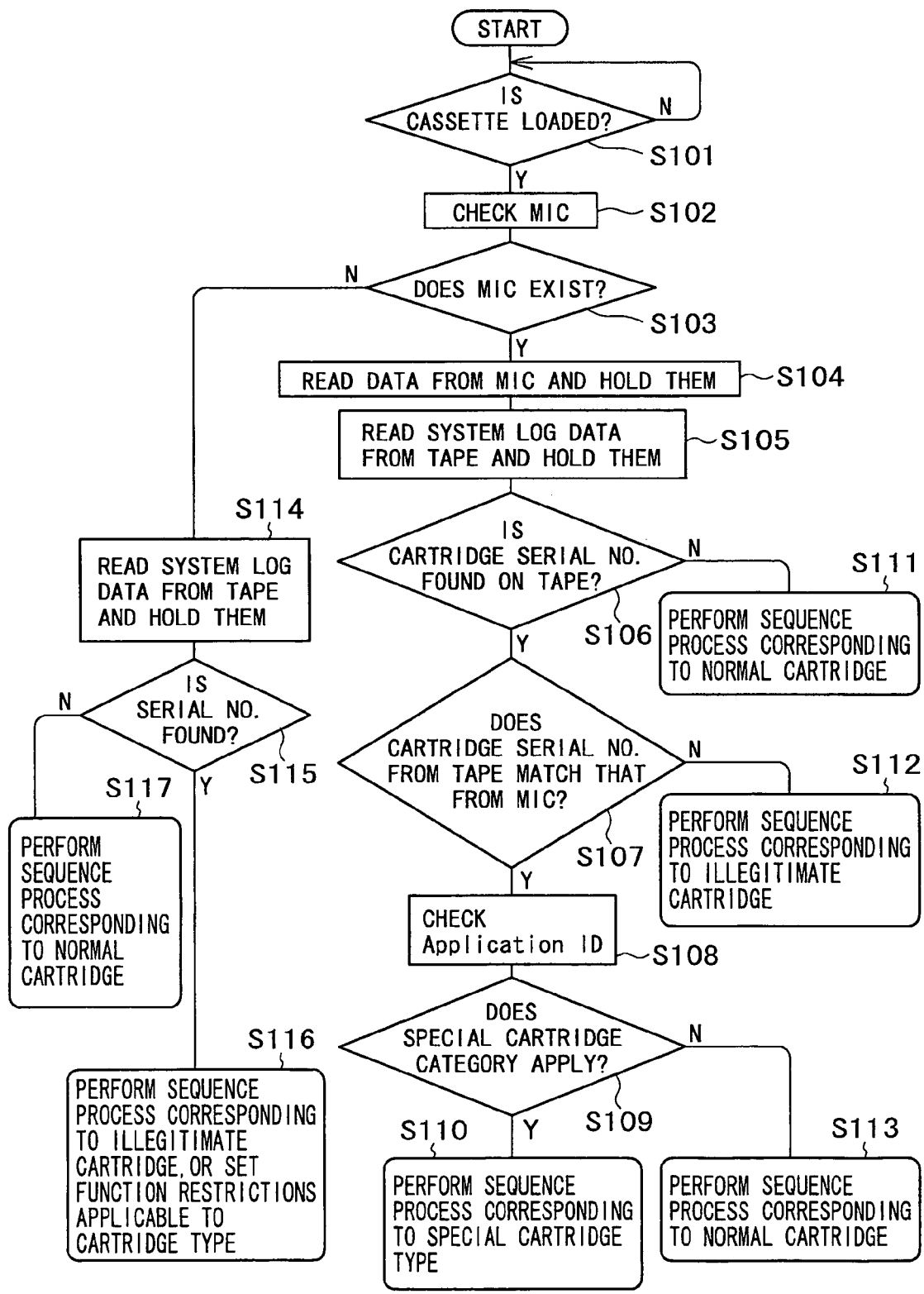
FIG. 15 is a flowchart of steps constituting an illegitimate cartridge handling process embodying the invention.

According to the invention, these fraudulent cases are circumvented by the tape streamer drive 10 illustratively carrying out the steps in the flowchart of FIG. 15. Specifically, the process in FIG. 15 is performed by the system controller 15 in the tape streamer drive 10.

In step S101, the system controller 15 first waits for a tape cassette (cartridge) to be loaded into the tape streamer drive 10. When the tape cassette is found to have been loaded, the system controller 15 goes to step S102.

If the loaded tape cassette has an MIC, the tape streamer drive 10 can gain access to that MIC. If the MIC is a remote memory chip 4, that chip can be accessed via the remote memory interface 30; if the MIC turns out to be a contact type memory 104, then the memory may be accessed through the connector block 45.

In step S102, an MIC check is carried out as one of the sequences that are executed upon loading of the tape cassette. The MIC check involves determining whether the MIC physically exists inside the loaded tape cassette. If the physical presence of the MIC is ascertained, then a check is made on the logical consistency of the data recorded in the MIC.

The check on the physical presence of the MIC is accomplished by determining whether communication is established with the MIC. Illustratively, the tape streamer drive 10 may transmit a predetermined command to the MIC in an attempt to gain access thereto. When a response to the command is received from the MIC, that response confirms the physical existence of the MIC. If the MIC is a contact type memory, the system controller 15 establishes electrical connection with the MIC through the connector block 45, which typically involves potential changes. Detecting such variations in potential verifies the physical presence of the MIC.

The logical consistency check on the stored data in the MIC is performed by accessing the data area in the MIC to see whether the data content in that area has a format compatible with the system of this embodiment. If the format is found compatible with the system, that means the logical consistency of the MIC is ascertained; if the format is found incompatible with the system, the logical consistency of the data in the MIC cannot be confirmed.

In step S103, the system controller 15 determines whether the MIC check in the preceding step S102 revealed that the MIC exists. The result of the check in step S103 is affirmative only if two conditions are met at the same time: the MIC must physically exist, and the logical consistency of the data in the MIC must be verified. If either or both of the two conditions are not satisfied, the result of the check in step S103 is negative.

If the physical presence of the MIC has led to the affirmative result of the check in step S103, steps S104 and S105 are carried out successively. These are sequence processes to be executed upon loading of the tape cassette.

In step S104, the system controller 15 reads data from the MIC and places them illustratively into the SRAM 24. The data read at this point from the MIC are typically structured as shown in FIG. 9.

Although not shown as a control process here, the magnetic tape is loaded following the earlier loading of the tape cassette. The loaded tape is run until it is set to a position permitting access to the system log on the tape for log data retrieval. In step S105, at the time the access to the system log area on the magnetic tape is completed, the system log data are read from the tape and placed into the SRAM 24.

When the above sequences are finished, the SRAM 24 of the tape streamer drive 10 holds two kinds of data: data from the MIC housed in the loaded tape cassette, and data from the system log recorded on the magnetic tape.

When the MIC-held data from the tape cassette and the system log data from the magnetic tape have been both retrieved and placed into the SRAM 24, step S106 is reached. In step S106, the system controller 15 determines whether the system log data from the magnetic tape contain the same cartridge serial number as that from the MIC.

With at least special-use cartridges such as the WORM cartridge, it is assumed as mentioned above that the cartridge serial number (see FIG. 9) is copied in advance from the MIC to the system log vender data area (see FIGS. 11 and 12) on the magnetic tape illustratively at tape formatting time. For the normal cartridge not subject to write or delete restrictions on the data recorded on the magnetic tape, the cartridge serial number may be optionally copied beforehand from the MIC to the magnetic tape.

The check in step S106 is made to determine whether the cartridge serial number is written in the system log data from the magnetic tape. If no serial number is detected in the system log data, that is interpreted to mean that the loaded tape cassette is at least a normal cartridge, not a special-use cartridge.

Where the cartridge serial number is written to the system log data on the magnetic tape in the special-use cartridge, the system log vender data type number is supposed to be set to 3 correspondingly, as shown in FIG. 11 (FIG. 12). It follows that the check in step S106 may be accomplished by finding out whether the value 3 is set as the system log vender data type number in the system log data.

If the result of the check in step S106 is negative, with the value 3 absent in the system log vender data type number of the system log data from the magnetic tape, this is interpreted to mean that the tape cassette loaded into the tape streamer drive 10 is an MIC-equipped normal cartridge as mentioned above.

In that case, step Sill is reached in which a sequence process corresponding to a normal cartridge is carried out. For example, the tape starts being run for access to a target tape position in which the ensuing data write or read operation is to be executed. After the target tape position is reached, the write or read operation and any other relevant operations are carried out as needed.

If the result of the check in step S106 is affirmative, with the value 3 present in the system log vender data type number of the system log data, this is interpreted to mean that the loaded tape cassette is either a special-use cartridge or a normal cartridge with a serial number copied onto the magnetic tape therein. In this case, step S106 is followed by step S107.

In step S107, a check is made to determine whether the cartridge serial number from the MIC of the loaded tape cassette matches the cartridge serial number recorded on the magnetic tape. More specifically, the two serial numbers are acquired in steps S104 and S105 from the data in the MIC and from the system log data on the magnetic tape. These numbers, once acquired and appropriately stored, are then compared to see if they match.

If the result of the check in step S107 is negative, with a mismatch detected between the cartridge serial number from the MIC and that from the magnetic tape, step S112 is reached as indicated. Such a mismatch contradicts the premise that the same cartridge serial number was copied from the MIC to the magnetic tape at the time of recording data to the tape. It is thus highly likely that the original MIC has been removed from the tape cassette and replaced by an illicit MIC. Hence the transition from step S107 to step S112 in which a sequence process corresponding to an illegitimate cartridge (i.e., corrupted tape cassette) is carried out.

The sequence process in step S112 corresponding to the illegitimate cartridge illustratively involves establishing a mode that disables the tape streamer drive 10 in both write and read operations. The user then has no choice but to get the loaded tape cassette ejected from the drive. With this mode established, it is impossible for the tape streamer drive 10 to write or read data to or from the illegitimate tape cassette whose original MIC has been tampered with. Data can be neither obtained from, nor falsified or destroyed on, the magnetic data in an illicit manner.

For example, if a malicious user substitutes an illicit memory for the original MIC of a WORM feature-equipped tape cassette (WORM cartridge) containing a data-carrying magnetic tape, then step S112 is reached. In this step, data can be neither written nor read to or from the magnetic tape in the tape cassette. With any attempt to access the corrupted WORM cartridge denied, all contents legitimately recorded so far on the magnetic tape therein are protected.

The transition from the check in step S107 to the process in step S112 for dealing with the illegitimate cartridge occurs in one of two cases: where the loaded cassette is a special-purpose cartridge, or where the loaded cassette is a normal cartridge with the serial number copied from its MIC to its magnetic tape. In other words, the cartridge type is not recognized at this point; no distinction is made between the special-use cartridge and the normal cartridge.

Where the normal cartridge is loaded, it may not be necessary to subject the cartridge to restrictions such as those applicable to the special-use cartridge. However, since the result of the check in step S107 on the serial number consistency is negative, it is highly likely that the MIC has been illicitly replaced even on this normal cartridge. In view of that possibility, it is deemed more appropriate to subject the tape cassette to the same restrictions as those governing the special-use cartridge. In any case, it is clear that the tape cassette has been tampered with as verified in step S107, so that the cassette is handled as an illegitimate cartridge regardless of its type.

If the result of the check in step S107 is affirmative, with a match detected between the cartridge serial number from the MIC and that from the magnetic tape, that means the tape cassette is free of irregularities such as illicit replacement of the MIC. In that case, step S107 is followed by step S108 and subsequent steps in which a sequence process corresponding to the actual format type (and cartridge type) is carried out.

In step S108, an application ID is read and referenced from the MIC data placed in the SRAM 24. The application ID occupies a one-byte area in the MIC manufacture part, as shown in FIG. 10. This is the area that designates the tape cassette type. For example, a specific value defined by the application ID indicates a normal cartridge. Where a plurality of special-use cartridge types exist, each of these cartridge types is uniquely defined by the application ID. If the loaded tape cartridge is, say, a WORM cartridge that falls under the special-use cartridge category, it is the application ID that designates the tape cassette as a WORM cartridge.

In step S109, a check is made to determine the type of the loaded tape cassette. Specifically, based on the result of the reference to the application ID in the preceding step S108, the system controller 15 determines whether the loaded tape cassette falls under the special-use cartridge category.

If the result of the check in step S109 is affirmative, with the type of the loaded tape cassette found to fall under the special-use cartridge category, that means the tape cassette is a legitimate, uncorrupted special-use cartridge. In that case, step S109 is followed by step S110.

In step S110, a sequence process is performed in accordance with the special-use cartridge type designated by the application ID. Illustratively, if the loaded tape cassette is a legitimate WORM cartridge, step S110 is reached in which the system controller 15 establishes an operation mode corresponding to the WORM cartridge. In this mode, all attempts to write data to the data-recorded areas on the magnetic tape are denied.

With that restraint in effect, any command issued illustratively by the host computer 40 to overwrite the recorded areas on the tape with new data is canceled. What can only be done here is to write data once to unrecorded areas on the magnetic tape and to read data from the recorded areas on the tape.

If the result of the check in step S109 is negative because the tape cartridge in question does not fall under the special-use cartridge category, that means the loaded tape cassette is a legitimate, uncorrupted normal cartridge. In that case, step S109 is followed by step S113 in which the sequence process corresponding to the normal cartridge is carried out. In step S113, as in step S111 above, the tape illustratively starts being run for access to a target tape position in which the ensuing data write or read operation is to be executed. After the target tape position is reached, the write or read operation and any other relevant operations are carried out as needed.

If the result of the check in step S103 is negative, with the absence of the MIC detected, then step S103 is followed by step S114 and subsequent steps.

In step S114, as in step S105 above, at the time the access to the system log area on the magnetic tape is completed, the system log data are read from the tape and placed into the SRAM 24. In the ensuing step S115, a check is made to determine whether a cartridge serial number is written in the system log data retrieved from the magnetic tape and held in the SRAM 24. This step is equivalent to the above-described step S106 involving finding out whether the value 3 is set in the system log vender data type number of the system log data.

If the result of the check in step S115 is affirmative, that means the cartridge serial number is found written on the magnetic tape despite the absence of an MIC. This inconsistency raises the strong possibility that the loaded tape cassette is an illegitimate cartridge. Step S115 is then followed by step S116 in which, as in step S112 discussed above, basically the sequence process corresponding to the illegitimate cartridge is carried out.

In this case, however, step S116 may have been reached for a different reason. That is, the result of the check earlier in step S103 might be negative because the tape cartridge was a legitimate special-use cartridge but its MIC was defective and failed to communicate.

If that eventuality is taken into account, indiscriminately inhibiting data write or read operations to or from the illegitimate cartridge is not fair to the user. The measures taken in step S116 could then be mitigated provided the type of the special-use cartridge can be identified; it is possible to establish function restrictions applicable to the cartridge type in question.

For example, if the special-use tape cassette turns out to be a WORM cartridge here, carrying out step S116 may involve setting restrictions whereby the writing of data to both the recorded and unrecorded areas on the tape is disabled but data can be read from its recorded areas. This guarantees the user a minimum function of the loaded tape cassette, permitting solely reproduction of data from the legitimate WORM cartridge equipped with a faulty MIC.

In the case of a normal cartridge, the user may also be guaranteed a minimum function of the loaded tape cassette, given the mitigating circumstances.

The type of the special-use cartridge can be identified illustratively by use of an identification hole formed on the cartridge enclosure. If there are provided a plurality of special-use cartridge types from now on (currently only one special-use cartridge type exists), all of these types are subject to the same function restrictions provided such restrictions will pose no problem to the users.

If the result of the check in step S115 is negative, with no cartridge serial number found written on the magnetic tape, that means the loaded tape cassette is a normal cartridge with no cartridge serial number copied to the magnetic tape illustratively at tape formatting time. In this case, the loaded tape cassette is a normal cartridge without an MIC or equipped with an MIC which is faulty. Step S115 is then followed by step S117. In step S117, as in step S111 discussed above, the sequence process corresponding to the normal cartridge is carried out.

So far, the WORM cartridge has been cited as the representative example of the special-use cartridge. In the future, varieties of special-use cartridges are expected to be introduced. Each of these cartridge types can be dealt with by the process shown in FIG. 15. That is, the sequence process corresponding to the special-use cartridge in step S110 is carried out in a flexible manner applicable to the cartridge type identified in step S108 using the application ID.

Tampering with any of such special-use cartridge types (e.g., MIC replacement) leads either to the negative result of the check in step S107 or to the positive result of the check in step S115. In any case, it is possible to make arrangements such that write or read operations to or from the illegitimate cartridge will be disabled.

Although the description above contains many specificities, these should not be construed as limiting the scope of the invention but as merely providing illustrations of some of the presently preferred embodiments of this invention. For example, the tape format and MIC data structure illustrated and described above may be modified in their details as needed. The tape drive apparatus of this invention is not limited to the tape streamer drive used for data storage; it can also be applied to tape drives for other purposes.

As described, the apparatus and method of the invention are used in combination with the recording medium that is a tape cassette housing a magnetic tape and equipped with a memory which holds management information for managing the writing and reading of information to and from the magnetic tape. The management information stored in the memory includes identification information which is uniquely assigned to each tape cassette so as to distinguish the cassette from other tape cassettes. The same identification information is supposed to be recorded in a predetermined area on the magnetic tape.

In operation, the inventive apparatus using the inventive method acquires the identification information from both the memory and the magnetic tape in the tape cassette loaded into the apparatus, to determine whether there is a match between the two sets of identification information. Subsequent write and read operations to and from the storage medium (tape cassette) are controlled at least in accordance with the result of the determination.

Since the identification information stored in the memory is unique to each tape cassette, a match detected between the memory-stored identification information and the tape-stored identification information ascertains that illicit replacement of the memory or other irregularities have not been committed on the tape cassette. In other words, an inconsistency in identification information between the magnetic tape and the memory is interpreted to signify a corrupted tape cassette. The tape cassette may then be subjected to injunctions against write and read operations to and from the magnetic tape therein.

Where the recording and reproduction of information to and from the illegitimate tape cassette are inhibited in the manner described, it is possible to prevent fraudulent uses of the tape drive system such as falsification, corruption or destruction of recorded data thereby. This enhances security against abuses of the tape drive system and improves its reliability.

What is claimed is:

1. A tape drive apparatus comprising:

tape-oriented recording and/or reproducing means for recording and/or reproducing information to and/or from a magnetic tape housed in a tape cassette furnished as a recording medium, said tape cassette being loaded in the apparatus;

memory accessing means for accessing a memory which is incorporated in said tape cassette furnished as said recording medium and which at least holds management information for write and/or read operations to and/or from said magnetic tape, said memory accessing means writing and/or reading information to and/or from said memory following the accessing;

memory-oriented information acquiring means for acquiring identification information from said memory through an access operation thereto performed by said memory accessing means, said identification information being stored in said memory as part of said management information and assigned uniquely to said tape cassette so as to distinguish said tape cassette from other tape cassettes;

tape-oriented information acquiring means for acquiring identification information from said magnetic tape through an access operation thereto performed by said tape-oriented recording and/or reproducing means, said identification information being recorded in a predetermined area on said magnetic tape and supposed to be the same in content as the memory-stored identification information;

determining means for determining whether there is a match between said memory-stored identification information acquired by said memory-oriented information acquiring means on the one hand and the tape-stored identification information acquired by said tape-oriented information acquiring means on the other hand; and operation controlling means for controlling the recording and/or reproduction of information to and/or from said recording medium by controlling the operation of said tape-oriented recording and/or reproducing means at least in accordance with a result of the determination made by said determining means.

2. A recording and/or reproducing method for use with a tape drive apparatus, the method comprising the steps of:

recording and/or reproducing information to and/or from a magnetic tape housed in a tape cassette furnished as a recording medium, said tape cassette being loaded in the apparatus;

accessing a memory which is incorporated in said tape cassette furnished as said recording medium and which at least holds management information for write and/or read operations to and/or from said magnetic tape, said memory accessing step writing and/or reading information to and/or from said memory following the accessing;

acquiring from said memory identification information which is stored in said memory as part of said management information and assigned uniquely to said tape cassette so as to distinguish said tape cassette from other tape cassettes;

acquiring from said magnetic tape identification information which is recorded in a predetermined area on said magnetic tape and supposed to be the same in content as the memory-stored identification information;

determining whether there is a match between said memory-stored identification information acquired in the memory-oriented information acquiring step on the one hand and the tape-stored identification information acquired in the tape-oriented information acquiring step on the other hand; and controlling the recording and/or reproduction of information to and/or from said recording medium at least in accordance with a result of the determination made in said determining step.

* * * * *